United States Patent [19]
Yokota

[11] Patent Number: 4,930,066
[45] Date of Patent: May 29, 1990

[54] MULTIPORT MEMORY SYSTEM

[75] Inventor: Haruo Yokota, Kawasaki, Japan

[73] Assignee: Agency of Industrial Science and Technology, Tokyo, Japan

[21] Appl. No.: 344,507

[22] Filed: Apr. 26, 1989

Related U.S. Application Data

[63] Continuation of Ser. No. 10,274, filed as PCT JP86/00136 on March 24, 1986, published as WO87/02488 on April 23, 1987, abandoned.

[30] Foreign Application Priority Data

Oct. 15, 1985 [JP]  Japan ................................ 60-229537

[51] Int. Cl.$^5$ ..................... G06F 13/00; G06F 13/06
[52] U.S. Cl. .................................. 364/200; 364/240; 364/243.6; 364/254; 364/254.3; 364/254.4
[58] Field of Search ... 364/200 MS File, 900 MS File

[56] References Cited

U.S. PATENT DOCUMENTS

| | | | |
|---|---|---|---|
| 3,806,881 | 4/1974 | Miwa et al. | 364/200 |
| 4,158,227 | 6/1979 | Baxter et al. | 364/200 |
| 4,254,463 | 3/1981 | Busby et al. | 364/200 |
| 4,285,039 | 8/1981 | Patterson et al. | 364/200 |
| 4,652,993 | 3/1987 | Scheuneman et al. | 364/200 |
| 4,707,781 | 11/1987 | Sullivan et al. | 364/200 |
| 4,710,868 | 12/1987 | Cooke et al. | 364/200 |

Primary Examiner—Gareth D. Shaw
Assistant Examiner—Jonathan C. Fairbanks
Attorney, Agent, or Firm—Staas & Halsey

[57] ABSTRACT

A multiport memory system has a plurality of data input/output ports, a plurality of memory banks, and a switching network for connecting the ports and the memory banks. A page address is transferred by way of a data line of the switching network and an address calculation is performed in each memory bank so that data can be read out of and written in to continuously via the plurality of ports.

4 Claims, 8 Drawing Sheets

MULTIPORT MEMORY SYSTEM

This is a continuation of co-pending application Ser. No. 010,027 filed as PCT JP86/00136 on March 24, 1986, published as WO87/02488 on April 23, 1987, abandoned.

BACKGROUND OF THE INVENTION

1. Field of the Invention

The present invention relates to a multiport memory system which permits simultaneous, page-by-page accesses from a number of the same or different kinds of processors or disk systems (each including disk units and a disk controller).

2. Description of the Related Art

Conventional memory systems accessible from a plurality of processors cope with an access collision by means of time sharing or an arbiter.

When the time sharing technique is utilized, the number of processors allowed to concurrently access the memory is only several at the most, owing to limited memory access time. In the case of employing the arbiter, only one of the processors competing for access is given acknowledgement at a time and the others are forced to wait their turn. Accordingly, an increase in the number of processors involved in the access conflict will cause a marked increase in the waiting time of each processor for its turn.

As a solution to these problems, there has recently been introduced a multiport memory system which is adapted to be accessed page by page and allow the access thereto to start anywhere in the page so that it permits concurrent accesses from a number of processors without forcing them to wait their turn (Yuzuru Tanaka, "A Multiport Page-Memory Architecture and a Multiport Disk-Cache System", New Generation Computing, Vol. 2, No. 3, pp. 241-260, 1984).

However, the above article makes no reference to an addressing method. Moreover, the system is defective in that an increase in the number of processors increases the width of connection bus, introducing difficulty in packaging, and in that pipeline processing for making up for a delay resulting from the use of a multi-stage switching network is complex, raising the cost of the entire system.

SUMMARY OF THE INVENTION

It is therefore an object of the present invention to provide a simple and economical multiport memory system which overcomes the defects of the conventional memory systems accessible from a plurality of processors and which permits simultaneous accesses from a certain number (dozens) of input/output (I/O) ports and enables them to read and write the same page after a sufficiently short waiting time.

The above object is obtained by providing a multiport memory system comprising: a plurality of data input/output ports for providing page addresses; a plurality of memory banks for storing pages of data and a switching network for rotating connections between the data input/output ports and said memory banks. Each page of data is stored across all of the memory banks. Addresses within each page are calculated in the memory banks. The switching network transfers page addresses, by way of data lines in the switching network, from any of the data input/output ports to any of the memory banks. Each of the memory banks passes an address to an adjacent memory bank in synchronization with the rotating of the connections by the switching network.

DESCRIPTION OF THE PREFERRED EMBODIMENT

Figure 1:
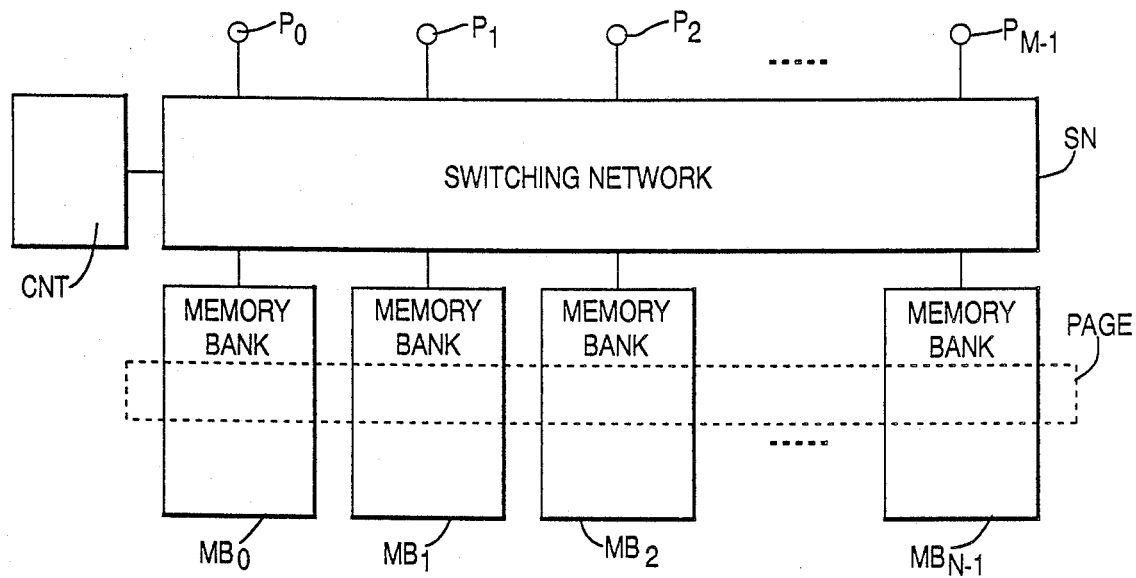
FIG. 1 is a block diagram illustrating the general arrangement of the multiport memory system of the present invention.

As shown in FIG. 1, the multiport memory system of the present invention comprises M data input/output ports $P_0$ to $P_{M-1}$, N memory banks $MB_0$ to $MB_{N-1}$, N being an integral multiple of the above-mentioned number M, a switching network SN for interconnecting the ports and the memory banks, and a controller CNT for the switching network, and stores each page across all the memory banks. A connection bus includes input and output data buses and several control lines. Each port transfers the address of a page to be accessed to the memory bank side via the input data bus. On the memory bank side the address in the page is incremented and data is input and output in synchronization with each other, thereby enabling a plurality of ports to access even the same page for reading out therefrom and writing therein continuous data.

For a simple and economical system configuration, the switching network SN may preferably be small in delay and easy to construct. The switching network can be constituted by, for example, PLAs(Programmable Logic Arrays) and counters through utilization of a bit-sliced connection bus.

In order to avoid the re-setting of the page address from the port side upon each switching of the connections between the ports and the memory banks $MB_0$ to $MB_{N-1}$ through the switching network SN, it is necessary that the page address corresponding to each port provided in each of the memory banks $MB_0$ to $MB_{N-1}$ be transported to the memory bank being switched to the port. To this end, the switching network SN is switched one by one to the right or left, and in synchronization with this, the page address is transported to the next memory bank in the direction of switching of the switching network SN. It is preferable, in this instance, to employ a shift register for setting and transporting the page address and to provide each memory bank with a latch for fixing the page address during the shift operation of the shift register so that the shift operation and the memory access can be effected at the same time, and a counter for incrementing the address in the page one by one for memory access use.

Moreover, the present invention includes an arrangement in which one page is divided into several blocks and memories for each block are accessed by, for example, one rotation of switching of all the memory banks. The reason for which the block unit is introduced will be described in detail later on.

Furthermore, the present invention provides a multiport memory system in which a buffer is provided between the switching network and each port and the buffer has an address calculation adder whereby the address in the page which is transferred between the switching network and each port is calculated from the sum of the value of a counter for switching the network and the number of each port, thereby enabling the access to start independently of the connection between the memory banks and the ports.

Now let it be assumed that the numbers of memory banks and ports are each N, i.e., M=N in FIG. 1, and that at a time t=0 a memory bank $MB_i$ and a port $P_i$, both i-th from the left, are interconnected. When switching the switching network so that a memory bank $MB_{(i+j) \bmod N}$ is connected to the port $P_i$ at a time $t=j$ (that is, at the time of the j-th switching), it is necessary only that the memory bank transport the page address to the next memory bank on the right side. However, the right most memory bank sends the page address to the leftmost memory bank. Letting the maximum number of pages that can be stored, the page length, and the block length be represented by K, $L_P$ and $L_B$, respectively, the number of bits to be transferred is given by $$\lceil \log_2 K \rceil + \lceil \log_2 N \rceil + \lceil \log_2(L_p/L_B) \rceil$$

In the above $\lceil \chi \rceil$ is the smallest integer larger than $\chi$, $\lceil \log_2 K \rceil$ the number of bits for the page address, $\lceil \log_2(L_p/L_B) \rceil$ the number of bits for the block address in the page, and $\lceil \log_2 N \rceil$ the number of bits for indicating the bank memory to which an access is started. Now, a description will be given of the reason for which the block unit is introduced in addition to the page.

The maximum waiting time of one port is the time interval between respective switching operations of the switching network if the memory bank to which an access is initiated could be recognized on the port side. If the block is not taken into account, the port will have to wait for a data transfer time corresponding to $L_P/N$. If the page length is shortened for the purpose of reducing the waiting time, then the page address will be lengthened and the memory management will become complicated. To avoid this, the memory is specified by the port on a pagewise basis and each page is divided into a plurality of blocks so that memories of one block are accessed by one rotation of the switching of the memory banks. That is, the access unit in the time intervals between the switching operations of the memory banks is $L_B/N$, and by an $L_P/L_B$ cycle of the switching of the memory banks, data of one page is accessed. If the access unit $L_B/N$ is too small, there will be no time for transporting the page address between the memory banks; and so the block length $L_B$ needs to satisfy the following condition:

$$L_B/N \geq \lceil \log_2 K \rceil + \lceil \log_2 N \rceil + \lceil \log_2(L_p/L_B) \rceil + \alpha$$

In the above, $\alpha$ is the time interval necessary for setting the page address from the port side.

On each port side, the block must be headed by $MB_0$ independently of the memory bank to which an access has been initiated. Since the memory bank to which the port Pi is connected at the time j is $MB_{(i+j) \bmod N}$ it is necessary only to access $[(L_B/N)\{(i+j) \bmod N\}+1]$-th to $(L_B/N)\{(i+j) \bmod N+1\}$-th data of that block. To perform this, it is desirable to provide a buffer between the switching network and each port and calculate the address in the buffer to be accessed from the switching network on the basis of the sum of the value of a counter for switching the switching network and the value of the number of the port. It is necessary that addresses in the block be synchronized between the memory bank side and the buffer side.

Next, a description will be given of a problem in packaging the multiport memory system of the present invention. A large width of the connection bus causes difficulty in packaging, but in the present invention, since the page address is transported and set through use of the data line of the switching network and the address in the page is incremented on the memory bank side, the width of the connection bus can be made smaller than in the prior art and the packaging of the system is less difficult. In addition, the system of the present invention is economical.

The present invention will hereinbelow be described in detail in connection with its embodiments.

Figure 2:
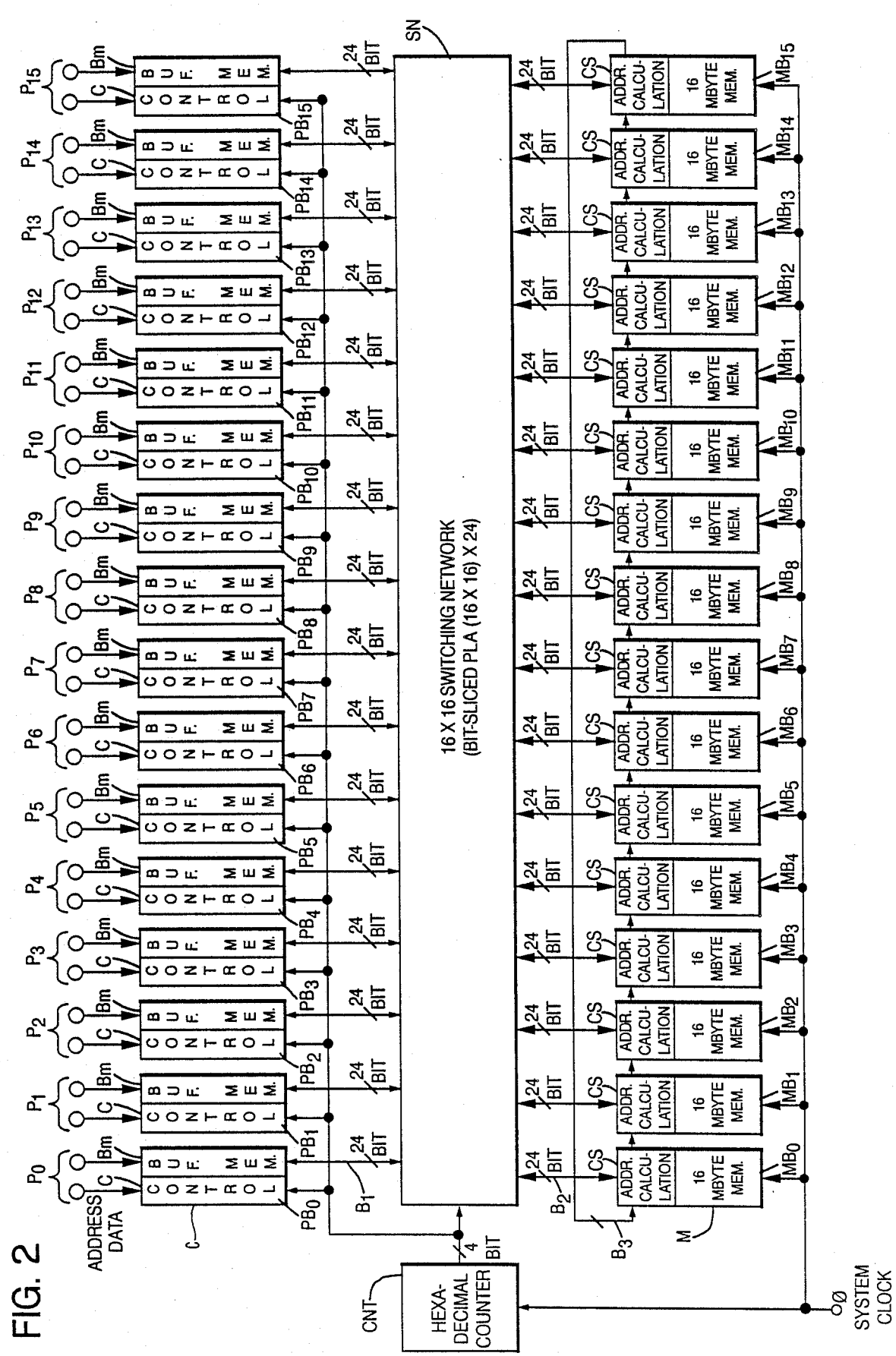
FIG. 2 is a block diagram of the principal part of an embodiment of the present invention.

FIG. 2 illustrates in block form the principal part of an embodiment of the present invention. Reference characters $P_0$, $P_1$, ... $P_{15}$ indicate 16 data input/output ports, $PB_0$, $PB_1$, ... $PB_{15}$ port buffers, each including a controller C and a buffer memory Bm, $MB_0$ to $MB_{15}$ 16 memory banks, SN a 16×16 switching network, and CNT a hexadecimal counter. Connection buses $B_1$ and $B_2$ each have a width of a total of 24 bits, one byte and one parity bit for write use, 9 bits for readout use, and 6 bits for control use. The switching network SN is switched clockwise in synchronization with a system clock $\phi$, so that the hexadecimal counter CNT is employed therefore.

The following Table 1 shows the values of the hexadecimal counter CNT and the connections between the ports and the memory banks.

TABLE 1

| VALUES OF HEXADECIMAL COUNTER AND CONNECTIONS BETWEEN PORTS AND MEMORY BANKS | | | | | | | | |
|---|---|---|---|---|---|---|---|---|
| HEXADECIMAL COUNTER | $P_0$ | $P_1$ | $P_2$ | $P_3$ | $P_4$ | $P_5$ | $P_6$ | $P_7$ |
| 0 | $MB_0$ | $MB_1$ | $MB_2$ | $MB_3$ | $MB_4$ | $MB_5$ | $MB_6$ | $MB_7$ |
| 1 | $MB_1$ | $MB_2$ | $MB_3$ | $MD_4$ | $MB_5$ | $MB_6$ | $MB_7$ | $MB_8$ |
| 2 | $MB_2$ | $MB_3$ | $MB_4$ | $MB_5$ | $MB_6$ | $MB_7$ | $MB_8$ | $MB_9$ |
| 14 | $MB_{14}$ | $MB_{15}$ | $MB_0$ | $MB_1$ | $MB_2$ | $MB_3$ | $MB_4$ | $MB_5$ |
| 15 | $MB_{15}$ | $MB_0$ | $MB_1$ | $MB_2$ | $MB_3$ | $MB_4$ | $MB_5$ | $MB_6$ |

HEXADECIMAL

TABLE 1-continued

VALUES OF HEXADECIMAL COUNTER AND CONNECTIONS BETWEEN PORTS AND MEMORY BANKS

| COUNTER | $P_8$ | $P_9$ | $P_{10}$ | $P_{11}$ | $P_{12}$ | $P_{13}$ | $P_{14}$ | $P_{15}$ |
|---|---|---|---|---|---|---|---|---|
| 0 | $MB_8$ | $MB_9$ | $MB_{10}$ | $MB_{11}$ | $MB_{12}$ | $MB_{13}$ | $MB_{14}$ | $MB_{15}$ |
| 1 | $MB_9$ | $MB_{10}$ | $MB_{11}$ | $MB_{12}$ | $MB_{13}$ | $MB_{14}$ | $MB_{15}$ | $MB_0$ |
| 2 | $MB_{10}$ | $MB_{11}$ | $MB_{12}$ | $MB_{13}$ | $MB_{14}$ | $MB_{15}$ | $MB_0$ | $MB_1$ |
| 14 | $MB_6$ | $MB_7$ | $MB_8$ | $MB_9$ | $MB_{10}$ | $MB_{11}$ | $MB_{12}$ | $MB_{13}$ |
| 15 | $MB_7$ | $MB_8$ | $MB_9$ | $MB_{10}$ | $MB_{11}$ | $MB_{12}$ | $MB_{13}$ | $MB_{14}$ |

In Table 1, $P_0$ through $P_{15}$ represent the numbers of the ports and $MB_0$ through $MB_{15}$ the numbers of the memory banks. Each memory bank transports the address to the next memory bank on the right side (to the leftmost memory bank, in the case of the rightmost memory bank) in synchronization with the switching of the switching network SN. To perform this, a one-bit data line $B_3$ is used for interconnecting shift registers (each included in an address calculating section CS of each memory bank) in the memory banks $MB_0$ to $MB_{15}$.

A more detailed description will hereinafter be given of the arrangement of each memory bank.

Figure 3:
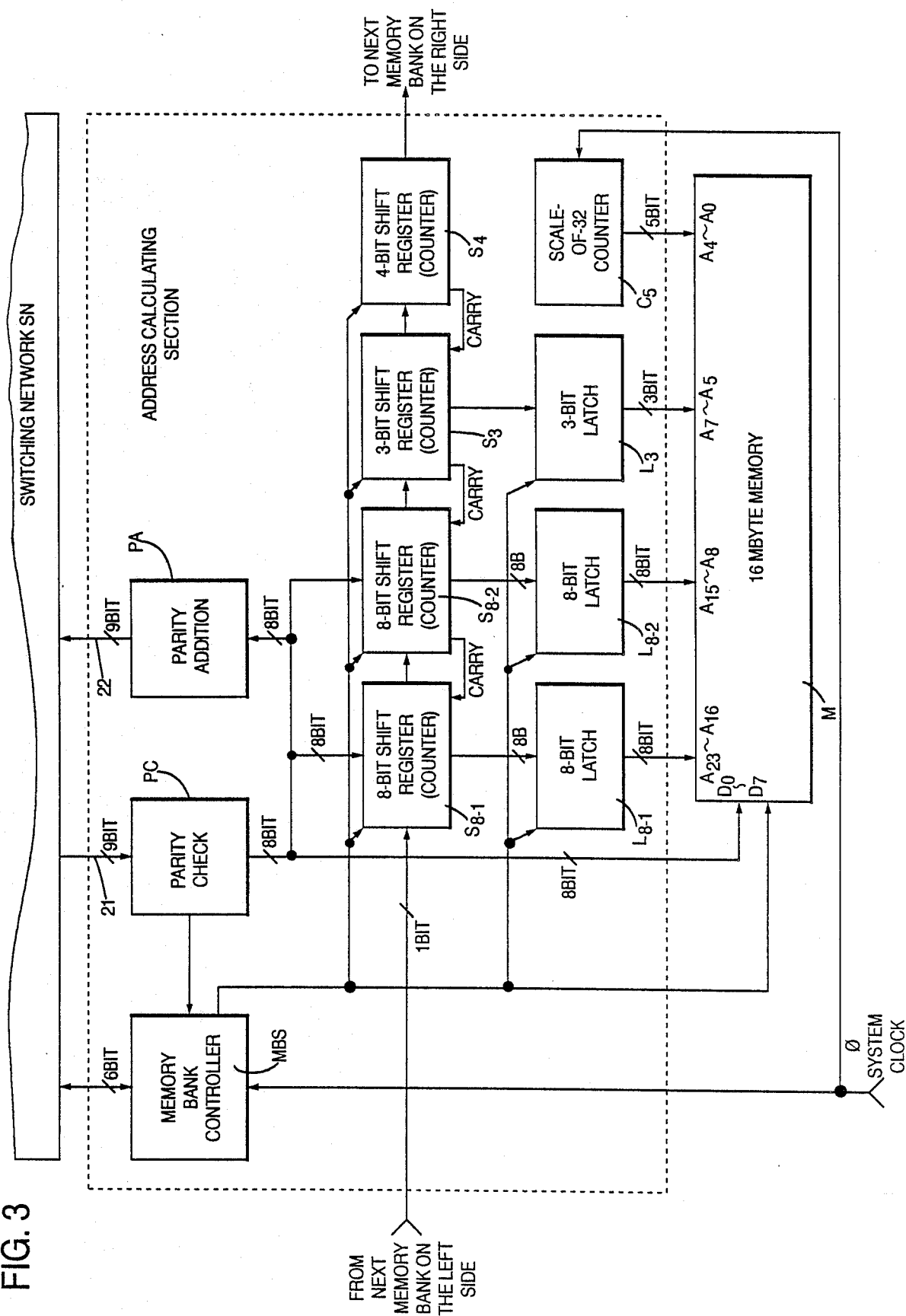
FIG. 3 is a block diagram showing in more detail the internal arrangement of one memory bank in FIGS. 1 and 2.
Figure 4:
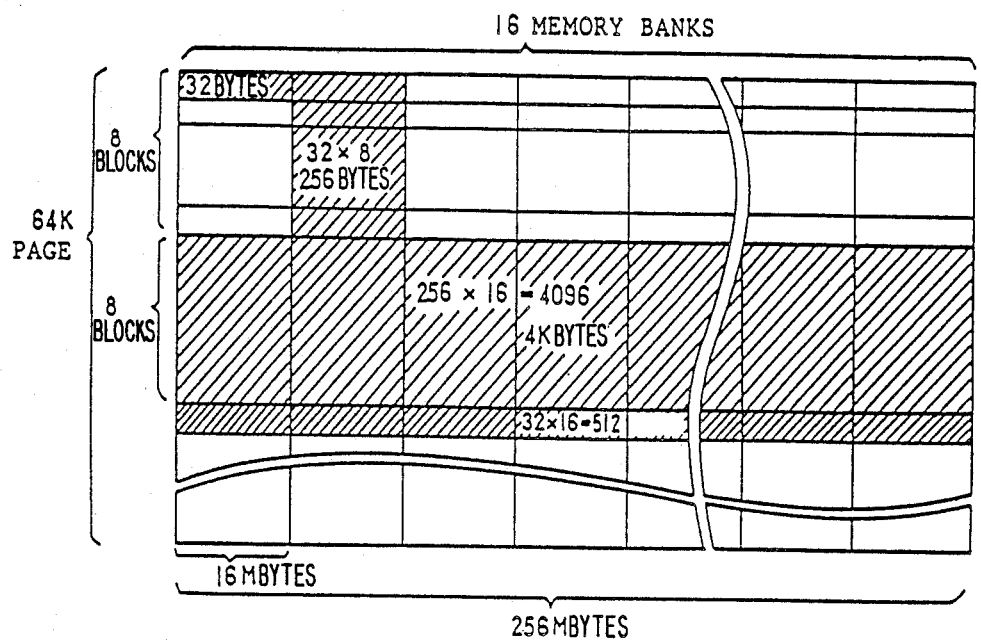
FIG. 4 is a diagram showing how the entire memory of the system in FIGS. 1 and 2 and in Table 1 is divided.

FIG. 3 is a block diagram illustrating in detail one of the memory banks $MB_0$ to $MB_{15}$ in FIG. 2. FIG. 4 shows how the entire memory is divided in this embodiment.

In this embodiment the total memory capacity of the memory system is 256 megabytes, the size of one page is 4K bytes, and the size of one block is 512 bytes, as shown in FIG. 4. With respect to the size of one block, when the number of memory banks used is 16, since the block size for each memory bank overlaps the time for transporting the address by the shift register and for setting the address from the ports $P_0$ through $P_{15}$ and is accessible, the portion of a block in each bank is selected to be 32 bytes long, and so one block is 512 bytes ($\neq 32 \times 16$) long. Further, by selecting the size of one page to be 4K bytes the total memory capacity becomes 64K pages, and two bytes are needed for page addressing. The memory capacity of one memory bank is 16 megabytes, dividing 256 megabytes by 16.

In FIG. 3, reference character M identifies a memory having a memory capacity of 16 megabytes ($\neq 8$ bits $\times 16$ million). $S_{8-1}$ and $S_{8-2}$ are combination shift registers/counters respectively storing 8 high- and low-order bits of the page address, $S_3$ is a combination 3-bit shift register/counter for counting eight blocks forming one page, and $C_5$ is a scale-of-32 counter for counting 32 bytes forming one block. In order that page addresses from the combination shift registers/counters $S_{8-1}$ and $S_{8-2}$ and the block address of the combination shift register/counter $S_3$ may be transported to the memory bank on the right side in synchronization with the switching of the switching network, the combination shift registers/counters $S_{8-1}$ and $S_{8-2}$ need to have an 8-bit parallel input for setting the page address and a 1-bit serial input/output for indicating the address to the memory, in addition to an 8-bit parallel output. Similarly, the combination shift register/counter $S_3$ must also be provided with a 3-bit parallel output and a 1-bit serial input/output. The combination shift register/counter $S_3$ has to be reset at the moment when the page address is set, because of the prerequisite conditions that the port side specifies the address on a pagewise basis and that the access starts at the top of the page. Furthermore, since it is necessary that after one cycle of scanning all the memory banks the process proceed to the next block, a 4-bit combination shift register/counter $S_4$ for counting 16 blocks is provided and its carry is input into the combination shift register/counter $S_3$. Incidentally, in the case where the buffer between each port and the switching network is left out and it is assumed that the access always starts from the memory bank $MB_0$, the combination shift register/counter $S_4$ can be omitted. In such a case, the combination shift register/counter $S_3$ is incremented by one in the memory bank $MB_0$. Moreover, in order to permit an access to an area spanning pages without the necessity of re-setting the page each time, it is desirable to input carries from the combination shift registers/counters $S_3$ and $S_{8-2}$ into the combination shift register/counter $S_{8-2}$ $S_{8-1}$, respectively.

Eight-bit latches $L_{8-1}$ and $L_{8-2}$ for the page address and a 3-bit latch $L_3$ for the block address are employed for fixing the page address and the block address so as to transport them to the next memory bank and to permit an overlap memory access. Further, a 5-bit, that is, a scale-of-32 counter $C_5$ is provided for incrementing the address one by one in one block. The page address and the block address must be transported to the next memory bank during an access to the 32 bytes, or another page address and another block address must be set from the port side.

Data and addresses are transferred between the switching network SN and the address calculation section CS of each bank via two 9-bit (8 bits and 1 parity bit) unilateral buses 21 and 22. A parity check and the addition of the parity bit are performed at the entry and exit of each memory bank, as indicated by blocks PC and PA, respectively, in FIG. 3.

The timing and enable of write and read are analyzed in a memory bank controller MBC in FIG. 3 through use of the system clock $\phi$ and a control signal from a port, and control signals are sent to the counters, the latches, and the memories.

Figure 5:
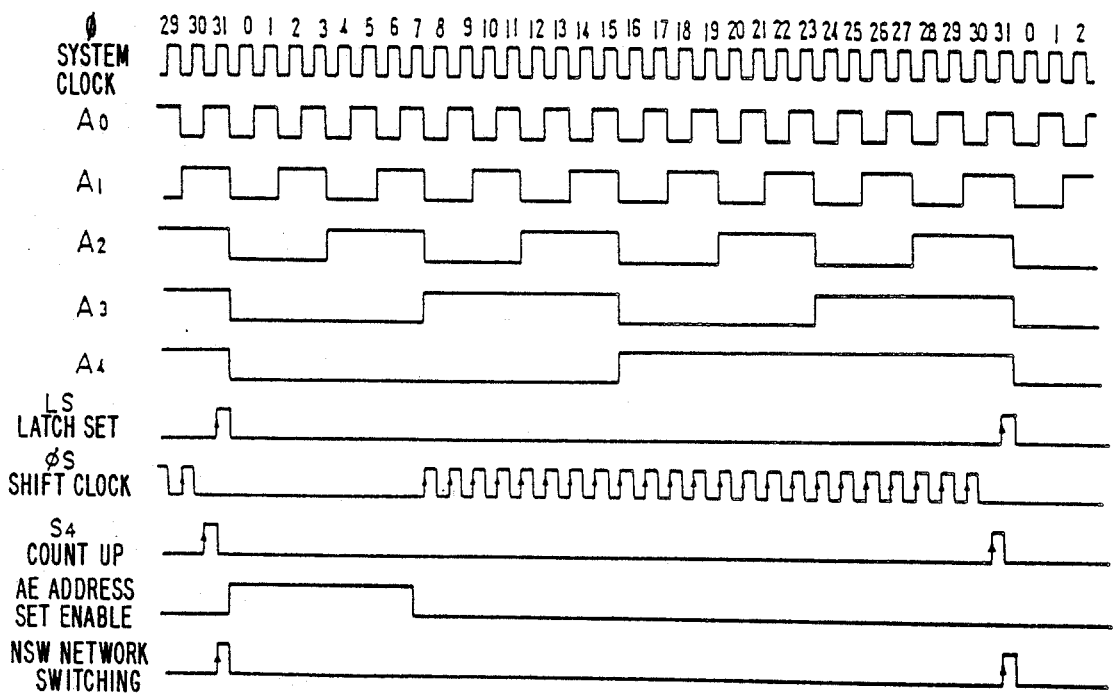
FIG. 5 is a timing chart of processing of the system shown in FIGS. 2 and 3.

FIG. 5 is a timing chart of the multiport memory system in FIGS. 2 and 3. The addresses of the memory banks are specified, as indicated by $A_0$, $A_1$, $A_2$, $A_3$, $A_4$, . . . in FIG. 5, and the memory banks are accessed from the respective ports in synchronization with the system clock $\phi$. In order to transport the page address and the block address to the next memory bank concurrently with the memory access, the addresses of the combination shift register/counters $S_{8-1}$, $S_{8-2}$ and $S_3$ are set in the latches $L_{8-1}$, $L_{8-2}$ and $L_3$ and a total of 23 bits including 16 bits for the page address, 3 bits for the block address and 4 bits for a bank count are transported bit by bit to the next memory bank on the right side in synchronization with a shift clock $\phi s$ prior to the transport of the page address and the block address. In this instance, if all the ports start the memory access at the memory bank $MB_0$, as referred to previously, the four bits for the bank count will be unnecessary. Otherwise, it is necessary that a counter for bank count use be counted up by one at the timing of counting-up of the counter $S_4$. In this case, the counter $S_4$ must be reset at the moment of setting the page address. The period in which the page address can be set from the port side is the interval to the start of shifting of the address after the termination of the counting-up of the counter $S_4$. The timing of address-set-enable AE in FIG. 5 indicates the above interval. The switching network must also be switched in synchronization with the system clock $\phi$ and it may preferably be switched simultaneously with the setting of the address in the latch. The timing of network switching NSW in FIG. 5 shows this switching timing.

Figure 6:
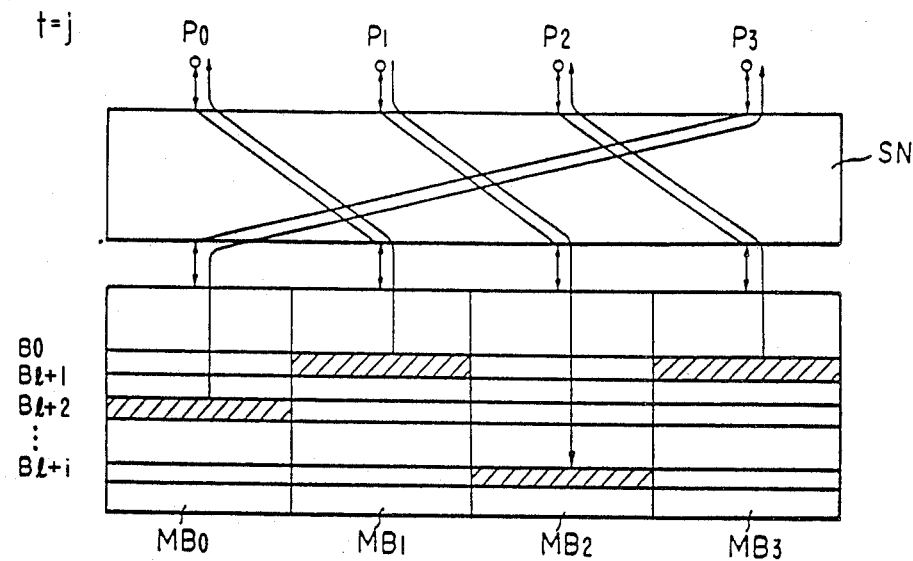
FIG. 6 is a diagram showing an access from each port at the time $t=j$.
Figure 7:
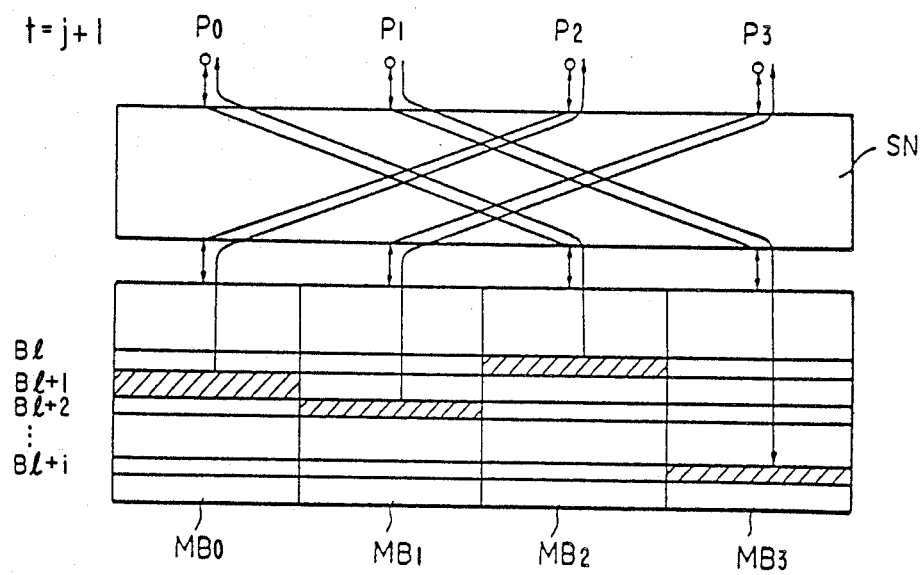
FIG. 7 is a diagram showing an access from each port at the time $t=j+1$.

FIG. 6 shows the state in which the multiport memory system of the present invention is accessed from four input/output ports at a certain point of time (t=j) and FIG. 7 indicates the accesses from the ports at a point of time (t=j+1) when the switching network is switched next.

Figure 8:
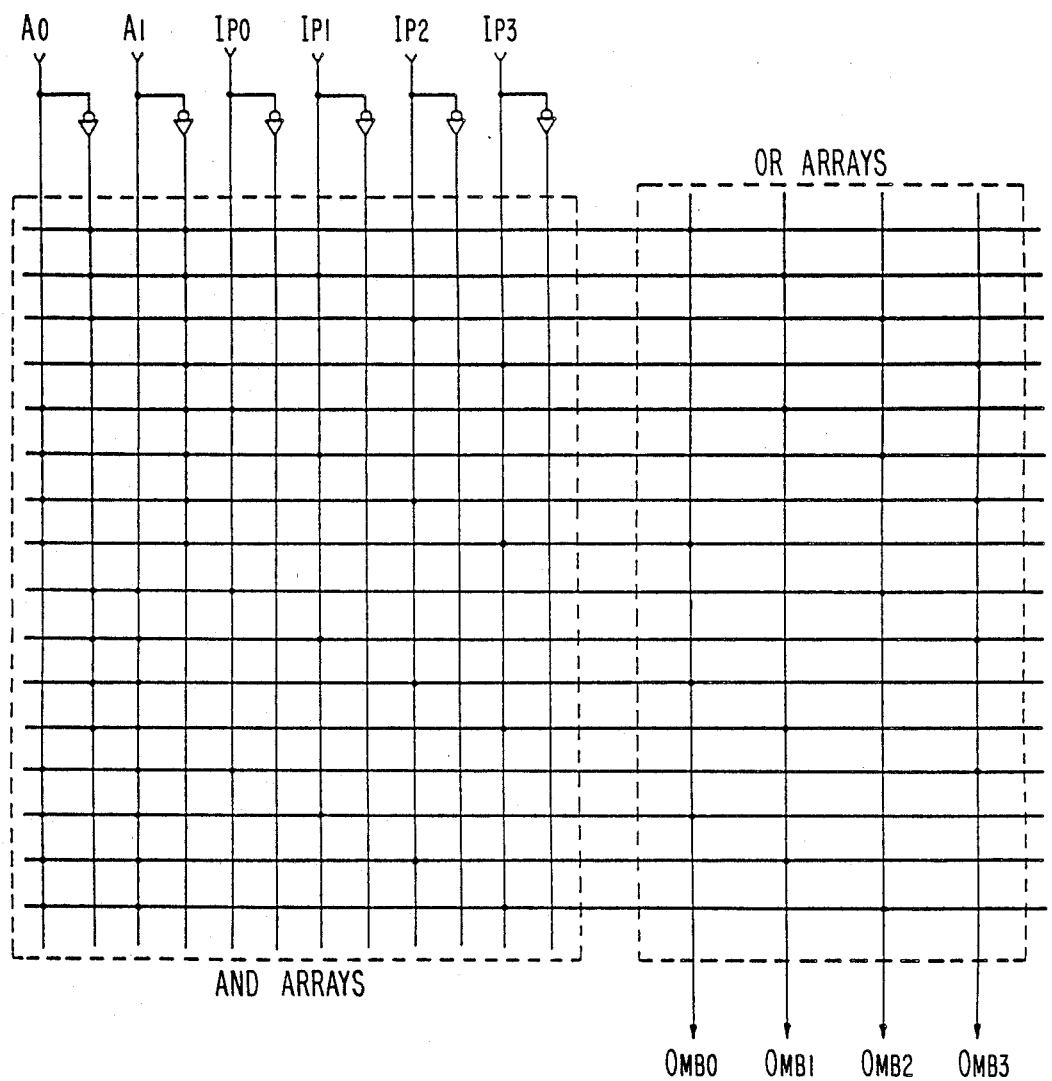
FIGS. 8 and 9 are wiring diagrams of a $4 \times 4$ switching network formed by PLAs, showing data lines for one bit of data which each port writes in and reads out of the memory bank side.

FIG. 8 shows an example in which data lines of a 4×4 switching network for one bit of data to be written from each port into the memory bank side are formed by programmable logic arrays. In FIG. 8, $I_{p0}$ through $I_{p3}$ are the inputs, that is, the ports, $O_{MB0}$ to $O_{MB3}$ are the outputs, that is, the memory banks, and $A_0$ and $A_1$ are outputs of quarternary counters for switching connections between the ports and the memory banks. The relationships among the counter outputs $A_0$ and $A_1$, the ports $I_{p0}$ to $I_{p3}$ and the memory banks $O_{MB0}$ to $O_{MB3}$, expressed by a logical formula, are given as follows:

$$
\begin{aligned}
O_{MB0} &= \bar{A}_0 \cdot \bar{A}_1 \cdot I_{p0} \vee A_0 \cdot \bar{A}_1 \cdot I_{p3} \vee \bar{A}_0 \cdot A_1 \cdot I_{p2} \vee A_0 \cdot A_1 \cdot I_{p1} \\
O_{MB1} &= \bar{A}_0 \cdot \bar{A}_1 \cdot I_{p1} \vee A_0 \cdot \bar{A}_1 \cdot I_{p0} \vee \bar{A}_0 \cdot A_1 \cdot I_{p3} \vee A_0 \cdot A_1 \cdot I_{p2} \\
O_{MB2} &= \bar{A}_0 \cdot \bar{A}_1 \cdot I_{p2} \vee A_0 \cdot \bar{A}_1 \cdot I_{p1} \vee \bar{A}_0 \cdot A_1 \cdot I_{p0} \vee A_0 \cdot A_1 \cdot I_{p3} \\
O_{MB3} &= \bar{A}_0 \cdot \bar{A}_1 \cdot I_{p3} \vee A_0 \cdot \bar{A}_1 \cdot I_{p2} \vee \bar{A}_0 \cdot A_1 \cdot I_{p1} \vee A_0 \cdot A_1 \cdot I_{p0}
\end{aligned}
\tag{1}
$$

Figure 9:
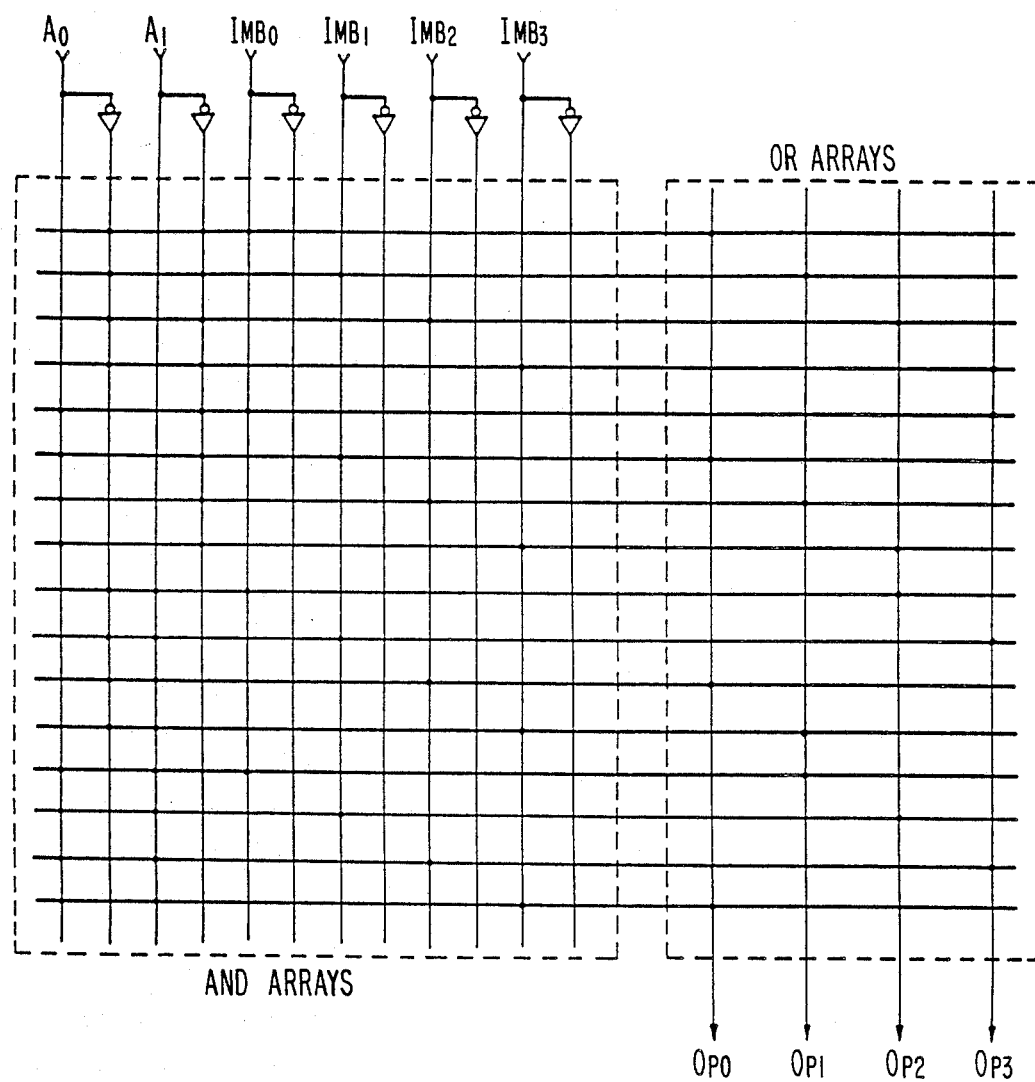

FIG. 9 shows an example in which data lines of the 4×4 switching network for one bit of data to be read out of the memory bank side from the port side are similarly formed by programmable logic arrays. In FIG. 9, $I_{MB0}$ to $I_{MB3}$ are inputs, that is, the memory banks, $O_{p0}$ to $O_{p3}$ the outputs, that is, the ports, and $A_0$ and $A_1$ the outputs of quarternary counters for switching the connections between the ports and the memory banks, as in the case of FIG. 8. The relationships among $A_0$ and $A_1$, $I_{MB0}$ to $I_{MB3}$ and $O_{p0}$ to $O_{p3}$, expressed by a logical formula, are as follows:

$$
\begin{aligned}
O_{p0} &= \bar{A}_0 \cdot \bar{A}_1 \cdot I_{MB0} \vee A_0 \cdot \bar{A}_1 \cdot I_{MB1} \vee \bar{A}_0 \cdot A_1 \cdot I_{MB2} \vee A_0 \cdot A_1 \cdot I_{MB3} \\
O_{p1} &= \bar{A}_0 \cdot \bar{A}_1 \cdot I_{MB1} \vee A_0 \cdot \bar{A}_1 \cdot I_{MB2} \vee \bar{A}_0 \cdot A_1 \cdot I_{MB3} \vee A_0 \cdot A_1 \cdot I_{MB0} \\
O_{p2} &= \bar{A}_0 \cdot \bar{A}_1 \cdot I_{MB2} \vee A_0 \cdot \bar{A}_1 \cdot I_{MB3} \vee \bar{A}_0 \cdot A_1 \cdot I_{MB0} \vee A_0 \cdot A_1 \cdot I_{MB1} \\
O_{p3} &= \bar{A}_0 \cdot \bar{A}_1 \cdot I_{MB3} \vee A_0 \cdot \bar{A}_1 \cdot I_{MB0} \vee \bar{A}_0 \cdot A_1 \cdot I_{MB1} \vee A_0 \cdot A_1 \cdot I_{MB2}
\end{aligned}
\tag{2}
$$

By expanding the formulae (1) and (2), as they are, to 16 bits for the input, 16 bits for the output, and 4 bits for the output of the connection switching hexadecimal counter, the connections of the ports and the memory banks shown in FIG. 2 can be realized on the both sides. By applying the following equations (3) and (4) thus expanded to 16×16 programmable logic arrays and using 24 such programmable logic arrays (corresponding in number to the bus width) in parallel, it is possible to obtain a small and economical switching network for the multiport memory system depicted in FIG. 2.

$$
\begin{aligned}
O_{MB0} &= \bar{A}_0 \cdot \bar{A}_1 \ldots \bar{A}_{15} \cdot I_{p0} \vee A_0 \cdot \bar{A}_1 \ldots \bar{A}_{15} \cdot I_{p15} \vee \ldots \vee A_0 \cdot A_1 \ldots A_{15} \cdot I_{p1} \\
O_{MB1} &= \bar{A}_0 \cdot \bar{A}_1 \ldots \bar{A}_{15} \cdot I_{p1} \vee A_0 \cdot \bar{A}_1 \ldots \bar{A}_{15} \cdot I_{p0} \vee \ldots \vee A_0 \cdot A_1 \ldots A_{15} \cdot I_{p2} \\
&\vdots \\
O_{MB15} &= \bar{A}_0 \cdot \bar{A}_1 \ldots \bar{A}_{15} \cdot I_{p15} \vee A_0 \cdot \bar{A}_1 \ldots \bar{A}_{15} \cdot I_{p14} \vee \ldots \vee A_0 \cdot A_1 \ldots A_{15} \cdot I_{p0}
\end{aligned}
\tag{3}
$$

$$
\begin{aligned}
O_{p0} &= \bar{A}_0 \cdot \bar{A}_1 \ldots \bar{A}_{15} \cdot I_{MB0} \vee A_0 \cdot \bar{A}_1 \ldots \bar{A}_{15} \cdot I_{MB1} \vee \ldots \vee A_0 \cdot A_1 \ldots A_{15} \cdot I_{MB15} \\
O_{p1} &= \bar{A}_0 \cdot \bar{A}_1 \ldots \bar{A}_{15} \cdot I_{MB1} \vee A_0 \cdot \bar{A}_1 \ldots \bar{A}_{15} \cdot I_{MB2} \vee \ldots \vee A_0 \cdot A_1 \ldots A_{15} \cdot I_{MB0} \\
&\vdots \\
O_{p15} &= \bar{A}_0 \cdot \bar{A}_1 \ldots \bar{A}_{15} \cdot I_{MB15} \vee A_0 \cdot \bar{A}_1 \ldots \bar{A}_{15} \cdot I_{MB0} \vee \ldots \vee A_0 \cdot A_1 \ldots A_{15} \cdot I_{MB14}
\end{aligned}
\tag{4}
$$

Figure 10:
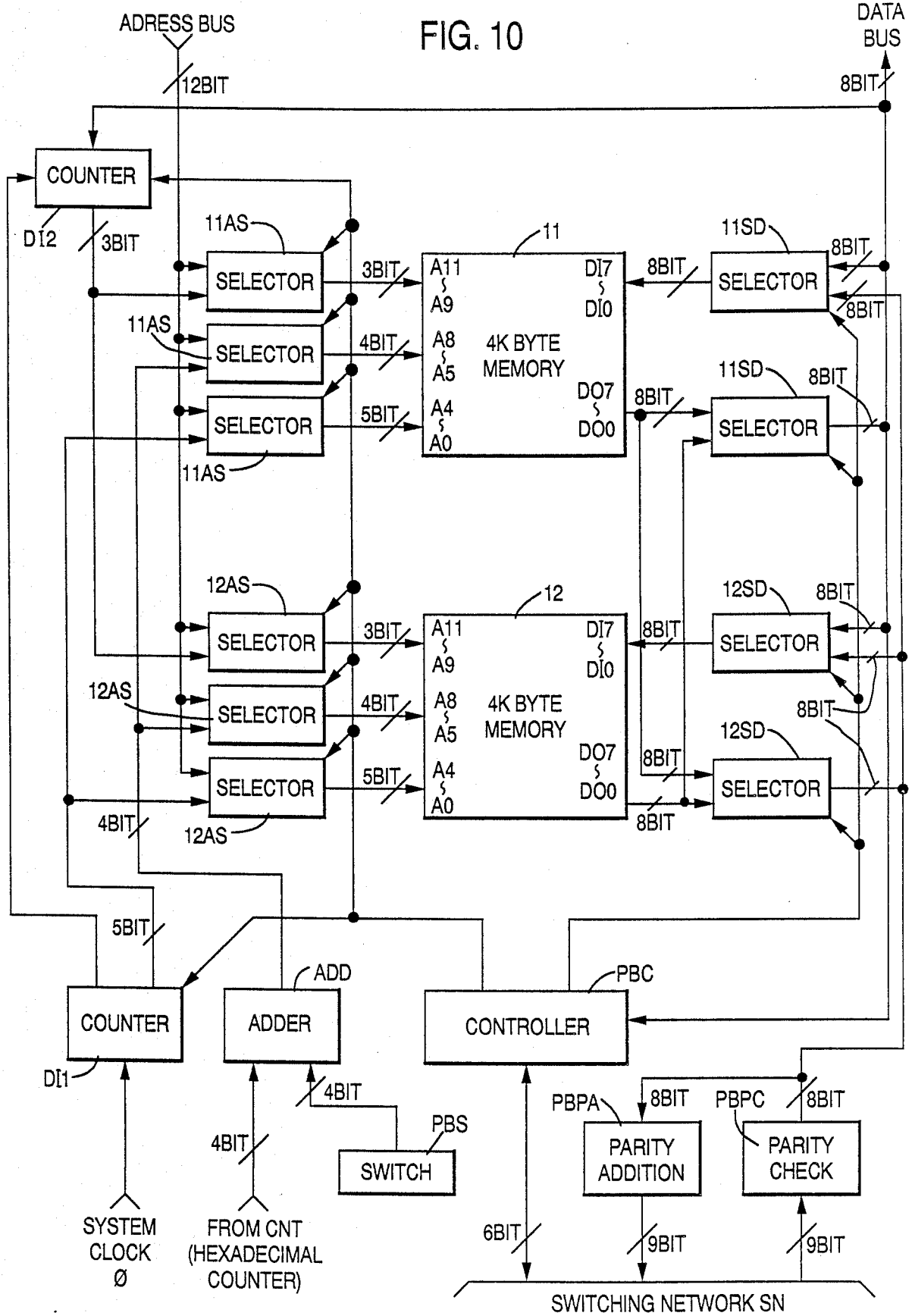
FIG. 10 is a more detailed block diagram of a port buffer in FIG. 2.

FIG. 10 is a block diagram illustrating in detail the port buffer $PB_i$ in FIG. 2.

The port buffer is provided for improving the overall efficiency of write and read.

In the case of writing a certain page, if the write is effected in the memory bank $MB_i$ connected via the switching network SN, starting at the top of the page, it is difficult to detect the beginning of the page at the time of readout, introducing difficulty in accessing the page. To avoid this, it is desirable to predetermine that the page always starts at a specific memory bank, for example, the memory bank $MB_0$. However, it is inefficient to defer the write until the port concerned is connected to the memory bank $MB_0$ by the switching network SN. The embodiment shown in FIG. 10 employs two 4K byte buffers (11 and 12) to form a double-buffer arrangement in which when the buffer 11 (or 12) is accessed from the port side, the other buffer 12 (or 11) is utilized for a data transfer to or from the memory bank side. In this instance, switching selectors 11AS and 12AS on the address side and selectors 11SD and 12SD on the data side control which of the buffers 11 and 12 is selected to be accessed from the port side or for data transfer to or from the memory banks. For instance, when the memory buffer 11 is switched and connected by the selectors 11AS and 11SD so that it is accessed by the port, the selectors 12AS and 12SD switch and connect the memory buffer 12 to the memory bank side.

An address for a data transfer is composed of five low order bits $A_0$ to $A_4$ produced by frequency dividing the system clock $\phi$ with a counter $DI_1$, four middle order bits $A_8$ to $A_5$ produced by adding, in an adder ADD, the number of the port set by a switch PBS and the output of the switching network counter (CNT), and three high order bits $A_9$ to $A_{11}$ produced by frequency dividing the system clock $\phi$ with a counter $DI_2$. Reference character PBC indicates a controller on the port side, PBPA a section for adding a parity bit to write data from the port side, and PBPC a parity check section for data read out of the memory bank side.

The use of such a port buffer permits a page-by-page access from the port side independently of the connections by the switching network. For example, in the case of a write from the port, the port buffer (11 or 12) in FIG. 10 calculates a write start address. As described previously with respect to FIG. 4, one page (4K bytes) is divided vertically into eight blocks, each of which is stored, by steps of 32 bytes, in the memory banks in the clockwise direction. For instance, in the case of writing from the port 4 when the value of the hexadecimal counter is a "0" in Table 1, the write starts at the memory bank $MB_4$ in FIG. 2. When the value of the counter is a "1", the write starts at the memory bank $MB_5$. That is, the port is connected to the memory bank $MB_i$ whose number is equal to the sum of the value of the counter and the number of the port. In consequence, data of the page to be stored is transferred, starting at an appropriate part thereof, from the port to the memory bank at which the write is started, that is, the data is written in the write start memory bank, starting at one block of the page, and then the write is effected in the succeeding memory banks one after another so that data at the bottom of the page is written in the last memory bank and data at the top of the first block of the page is written in the first memory bank ($MB_0$, for example). In this embodiment, the write start address for the page to be written is obtained by adding the value of the hexadecimal counter CNT and the address of the port, for example, a value 5 in the case of the port $P_5$. Accordingly, the write start address can be obtained simply by performing the above calculation in each port.

The same method as mentioned above is employed for reading out data from the memory bank side. The readout starts at the memory bank $MB_i$ connected to the port, and when the read-out data is written in one of the buffers, for instance, 11, the number of the port and the value of the hexadecimal counter CNT is added by the adder ADD and the sum is used as the addresses $A_5$ to $A_8$ for accessing the buffer 11, whereby the data read out of the memory bank side is stored in the buffer 11, starting at the top of the page. Accordingly, it is easy to access the buffer 11 for reading out the data therefrom.

While the present invention has been described with respect to its embodiment, the multiport memory system of the present invention is not limited specifically thereto and can be modified within the spirits of the appended claims.

According to the present invention, a page address is transferred by way of a data line and an address calculation is performed in each memory bank, by which it is possible to reduce the bus width which would otherwise introduce difficulties in packaging in a multiport memory system. The entire system can be made small and economical.

Furthermore, a simple-structured switching network of little delay can be configured through utilization of bit-slice and PLA techniques.

Moreover, by switching the connection between each port and each memory bank through the switching network to the next memory bank one by one, the address in the memory bank needs only to be transported to the next memory bank and the address need not be re-set upon each switching to the next bank, making it possible to provide a system which permits an efficient access to continuous areas. In addition, since the address transfer to the next memory bank and a memory access from the port can simultaneously be achieved independently of each other, data can be read out from and written in continuous areas without unduly increasing the access time therefor.

Besides, according to the present invention, a buffer is provided between the switching network and each port and the port has an address calculating adder by which an in-page address, which is transferred to and from the switching network, is calculated from the sum of the value of a switching network counter and the number of each port. This allows an access to start independently of the connections between the memory banks and the ports.

The multiport memory system of the present invention, which has such features, can widely be used as a shared memory in a parallel processing system, and is very useful especially for a relational data base machine and a knowledge base machine in which the access unit is basically a page.

What is claimed is:

1. A multiport memory system, comprising:
   a plurality of data input/output ports for providing page addresses only once per page;
   a plurality of memory banks for storing pages of data, each page stored across all of said memory banks and addressed page by page using the page addresses from said data input/output ports, each of said memory banks including means for calculating addresses to access all of the data within each page; and
   a switching network, connected to said data input/output ports and said memory banks, for rotating logical connections from each of said data input/output ports to all of said memory banks by sequential switching of data lines in said switching network, for transferring the page addresses from said data input/output ports to any of said memory banks connected thereto when a page access is initiated and for transferring data from said memory banks to said data input/output ports connected thereto for each of the logical connections, each of said memory banks passing an address directly to another memory bank adjacent thereto in synchronization with the rotating of the logical connections.

2. A multiport memory system according to claim 1, wherein said switching network comprises data transfer buses connected between said data input/output ports and said memory banks, for transferring data to and from said data input/output ports and said memory banks, said buses comprising:
- bit-sliced programmable logic arrays, connected to said data input/output ports and said memory banks; and
- counters, connected to said programmable logic arrays, for controlling the connections provided by said switching network by supplying signals to said programmable logic arrays.

3. A multiport memory system according to claim 1 or 2, wherein said memory banks include:
- memories for storing data in blocks having block addresses, each page having a predetermined number of blocks and each block having a size equal to an amount of data transferred between said data input/output ports and said memory banks during one complete rotation of the logical connections;
- address counters, connected to said memories, for incrementing the addresses, between each change in the logical connections, by an increment amount corresponding to a time interval required to transfer the page addresses to said memory banks from said data input/output ports and to transfer the page and block addresses between memory banks and for detecting block boundaries;
- shift registers, each memory bank including at least one shift register connected to said switching network, one of said address counters and said shift registers in said memory banks adjacent thereto, for transferring the page and block addresses between said memory banks in synchronization with changes in the logical connections provided by said switching network, for incrementing the block addresses in response to detection of the block boundaries by the one of said address counters connected thereto and for incrementing the page addresses when a final block address of the predetermined number of blocks is reached; and
- latches, each connected to one of said shift registers and at least one of said memories, for holding one among the page and block addresses during operation of said address counters and said shift registers.

4. A multiport memory system, comprising: a plurality of data input/output ports, each providing a page address only when a page access is initiated;
- a plurality of memory banks for storing pages of data divided into blocks having block addresses and block boundaries therebetween, each page stored across all of said memory banks, each one of said memory banks having at least one other of said memory banks adjacent thereto and including:
  - an address counter for incrementing an address used to access the one of said memory banks by an increment amount corresponding to a time interval required to transfer the page addresses to said memory banks from said data input/output ports and to transfer the page and block addresses between memory banks, during transfer of one of the page addresses to the one of said memory banks;
  - a shift register for incrementing the block addresses, for incrementing the page addresses when a predetermined block boundary is reached and for transporting the page and block addresses, used for accessing the one of said memory banks, directly to the at least one other of said memory banks adjacent thereto; and
  - a latch, connected to said shift register, for holding the page address during operation of said shift register;
- switching network means for providing connections between said data input/output ports and said memory banks, the page address being transported between said memory banks via said shift register in said memory banks in synchronization with changes in the connections provided by said switching network to enable data to be read out of and written into one of the pages in a continuous stream, said switching network means including counter means for controlling changes in the connections; and
- buffers, connected between said switching network and said data input/output ports, respectively, each buffer including an address calculating adder for calculating an in-page address, to be transferred to said switching network, by adding a value counted by said counter means and a number assigned to a corresponding port, an access via the corresponding port being started independently of the connections provided by said switching network between said memory banks and said data input/output ports.

* * * * *